United States Patent [19]
Wagner et al.

[11] 3,884,268
[45] May 20, 1975

[54] VALVE CONSTRUCTION AND METHOD OF MAKING THE SAME

[75] Inventors: Joseph P. Wagner, Knoxville; Ronnie C. Jenkins, Sevierville, both of Tenn.

[73] Assignee: Robertshaw Controls Company, Richmond, Va.

[22] Filed: Jan. 25, 1974

[21] Appl. No.: 436,517

[52] U.S. Cl. ............ 137/625.36; 251/366; 29/157.1
[51] Int. Cl. ........................ F16k 27/04; F16k 3/316
[58] Field of Search ..... 137/625.36, 625.34, 625.35; 251/366

[56] References Cited
UNITED STATES PATENTS

| | | |
|---|---|---|
| 1,813,222 | 7/1931 | Barrett ...................... 137/625.34 X |
| 1,840,564 | 1/1932 | Brown ........................... 137/625.36 |
| 2,880,748 | 4/1959 | Elsey .......................... 137/625.36 X |
| 3,805,839 | 4/1974 | Baumann ...................... 137/625.35 |

*Primary Examiner*—Arnold Rosenthal
*Attorney, Agent, or Firm*—Candor, Candor & Tassone

[57] ABSTRACT

A valve construction having a valve body provided with an inlet and an outlet interconnected together by a chamber in the valve body. A one-piece valve seat cage is disposed in the chamber and has a pair of spaced aligned valve seats disposed between the inlet and the outlet. The cage has integral guides disposed on opposite sides of the valve seats to movably guide a valve stem passing through the valve cage and having a pair of valve members respectively cooperating with the valve seats to open and close the same.

12 Claims, 2 Drawing Figures

VALVE CONSTRUCTION AND METHOD OF MAKING THE SAME

This invention relates to an improved valve construction and to a method of making the same.

Conventionally, top and bottom guided valve constructions have a plurality of inserts in the web of the valve body at the valve seat or seats thereof and also inserts to provide guides at the top end and at the bottom end of the valve stem that carries the valve member or members for opening and closing the valve seat or seats.

It is a feature of this invention to provide a valve construction wherein the number of parts is greatly reduced so that the same can be manufactured at a minimum of time, effort and cost.

In particular, one embodiment of this invention provides a valve construction having a valve body provided with an inlet and an outlet interconnected by a chamber of the valve body. A one-piece valve seat cage is disposed in the chamber and has valve seat means disposed between the inlet and the outlet. The cage has integral guides disposed on opposite sides of the valve seat means thereof. A valve stem means is movably guided by the guides and has valve member means for cooperating with the valve seat means to open and close the same. The valve body has an opening therein leading to the chamber thereof and the valve seat cage can be insertable through the opening into the chamber and be removable from the chamber out through the opening in a simple manner, a cover member being detachably secured to the valve body to close such opening.

Accordingly, it is an object of this invention to provide an improved valve construction having one or more of the novel features set forth above or hereinafter shown or described.

Another object of this invention is to provide an improved method of making such a valve construction or the like, the method of this invention having one or more of the novel features set forth above or hereinafter shown or described.

Other objects, uses and advantages of this invention are apparent from a reading of this description which proceeds with reference to the accompanying drawing forming a part thereof and wherein.

Figure 1:
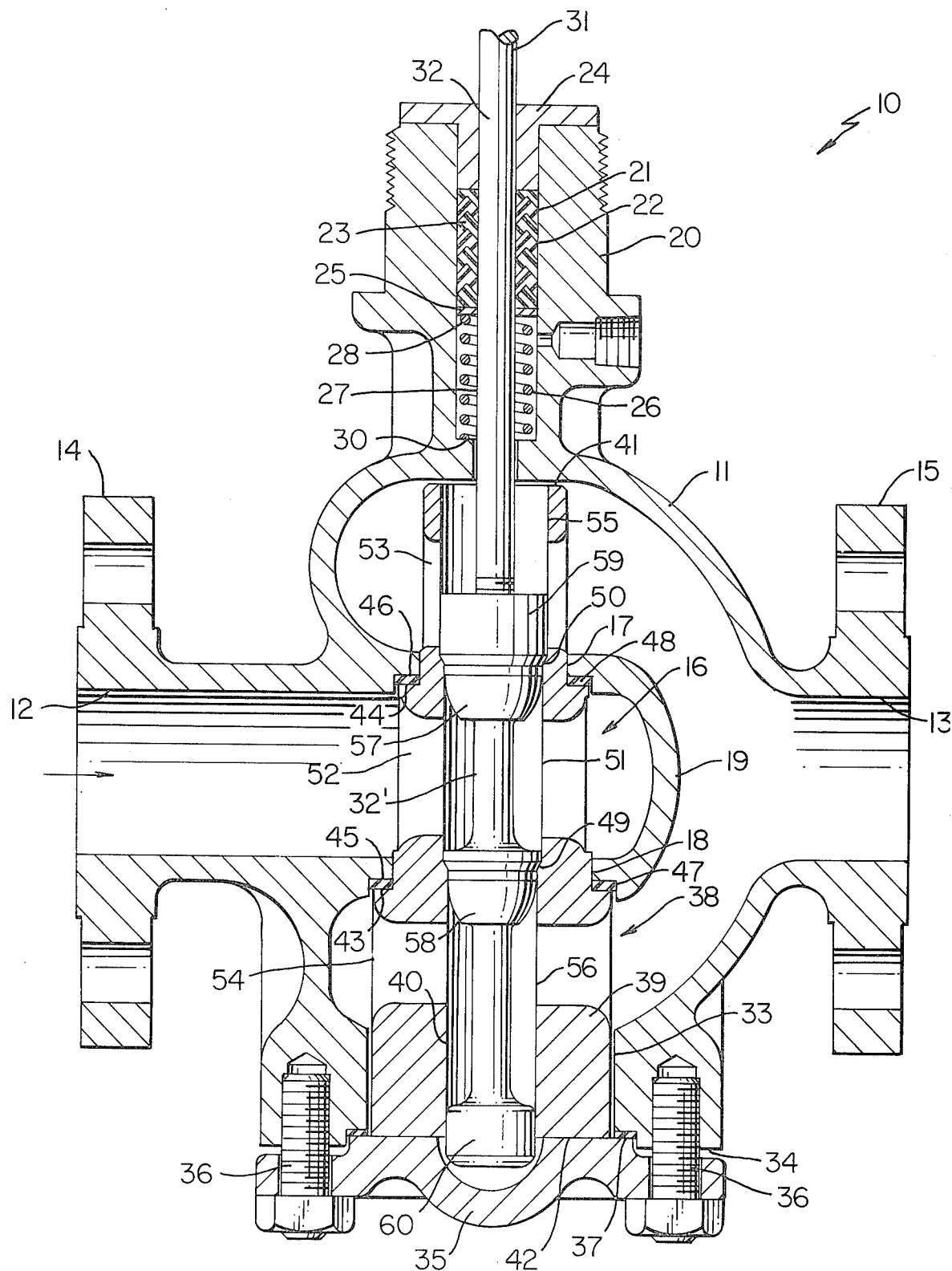
FIG. 1 is a cross-sectional view of the improved valve construction of this invention, the valve construction being shown with the valve seat means thereof closed by the valve member means of the valve construction.

While the various features of this invention are hereinafter described and illustrated as being particularly adapted to provide a double seated valve construction, it is to be understood that the various features of this invention can utilize singly or in any combination thereof to provide valve construction with one or more seats as desired.

Therefore, this invention is not to be limited to only the embodiment illustrated in the drawings, because the drawings are merely utilized to illustrate one of the wide variety of uses of this invention.

Figure 2:
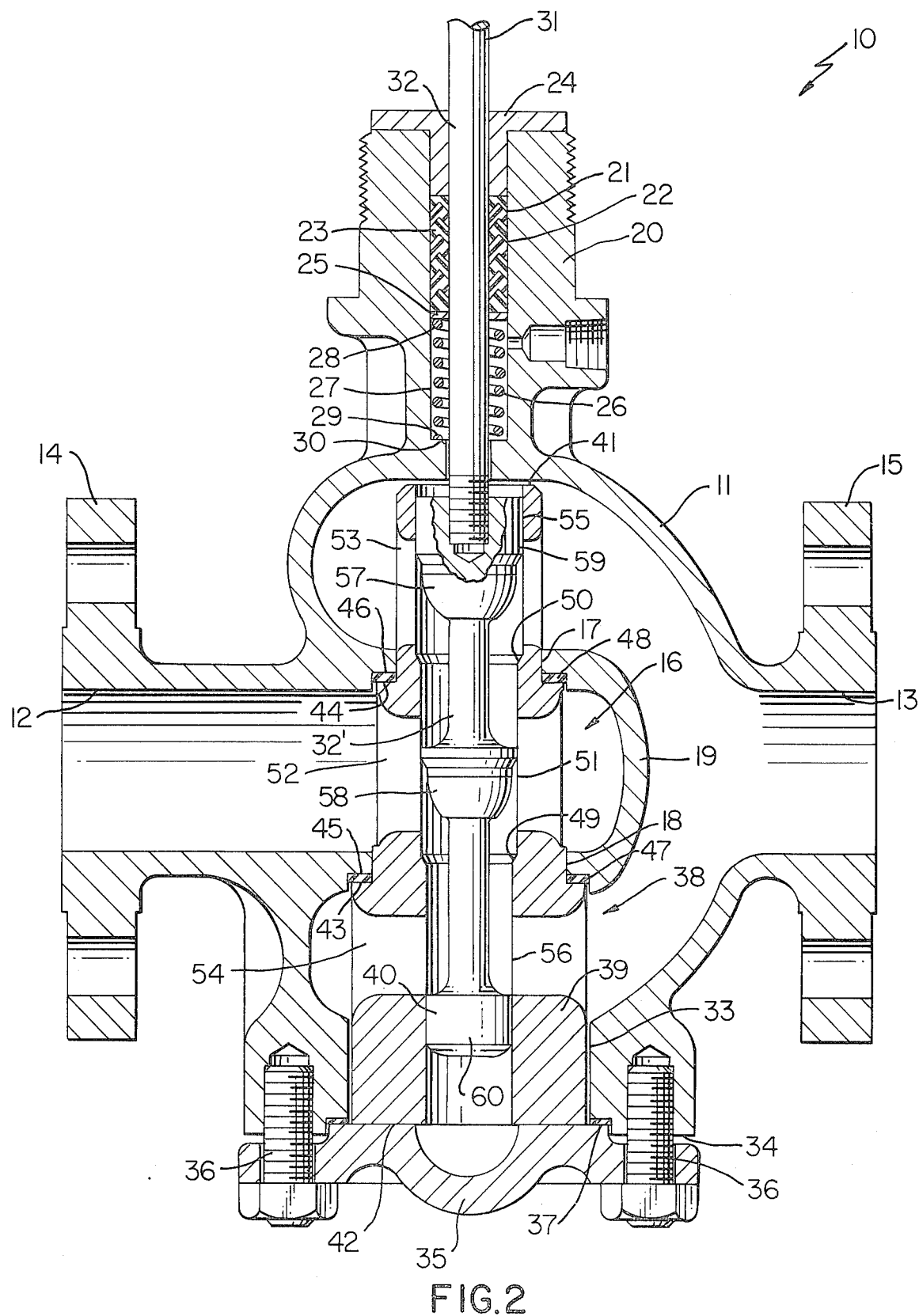
FIG. 2 is a view similar to FIG. 1 and illustrates the valve seat means in an open condition thereof.

Referring now to FIGS. 1 and 2, the improved valve construction of this invention is generally indicated by the reference numeral 10 and comprises a one-piece valve body 11 having an inlet 12 and an outlet 13 formed therein and interrupting opposed mounting flanges 14 and 15 thereof, the inlet 12 and outlet 13 respectively leading to a chamber that is generally indicated by the reference numeral 16 in the drawings and formed between a pair of concentric openings 17 and 18 formed through an internal web portion 19 of the valve body 11.

The valve body 11 has a bonnet 20 formed integrally therewith with a stepped opening 21 being formed through the bonnet 20 and interconnecting with the upper part of the outlet 13. The opening 21 has a portion 22 thereof defining a packing cavity that is adapted to receive packing material 23 held therein by an end cap 24 and a spring retainer 25 urged toward the end cap 24 by a compression spring 26 disposed in the lower portion 27 of the opening 21 and having one end 28 bearing against the spring retainer 24 and the other end 29 thereof bearing against a shoulder 30 of the valve body 11.

In this manner, a valve stem means 31 of this invention is adapted to have an upper part 32 thereof passed through the opening 21 of the valve bonnet 20 to the exterior of the valve construction 11 to be controlled by suitable actuator means (not shown) to move the valve stem 31 between its valve closed and valve open positions of FIGS. 1 and 2 in a manner hereinafter described.

Thus, it can be seen that the packing material 23 seals the opening 21 that is in communication with the outlet 13 from the exterior of the valve body 11 even though the valve stem means 31 projects out to the exterior thereof.

The valve body 11 has an opening 33 interrupting the lower end 34 thereof with the opening 33 being disposed in aligned relation with the openings 17 and 18 formed in the web 19, the opening 33 in the valve body 11 being adapted to be opened and closed by an end plate or cover member 35 detachably secured to the end wall 34 of the valve body 11 by threaded fastening members 36 and being sealed to the end wall 34 by an interposed resilient gasket means 37.

A one-piece valve seat cage of this invention is generally indicated by the reference numeral 38 and comprises a stepped cylindrical member 39 having a stepped bore 40 passing axially therethrough from the upper end 41 thereof to the lower end 42 thereof, the stepped cylindrical configuration of the member 39 defining annular shoulders 43 and 44 thereon that are adapted to cooperate with annular shoulders 45 and 46 formed on the valve body web 19 adjacent the openings 18 and 17 thereof when the valve seat cage 38 is inserted into the chamber 16 by first being passed through the opening 33 before the cover 35 is utilized. Suitable resilient gasket means 47 and 48 are respectively disposed between the cooperating shoulder means 43, 45 and 44, 46 to effectively seal the valve seat cage 38 at the openings 18 and 17 of the valve body web 19 when the cover member 35 is subsequently attached to the end wall 34 because the secured cover member 35 engages against the lower end 42 of the cage 38 and locks the same in place as illustrated.

The stepped bore 40 of the valve seat cage 38 defines a pair of aligned space valve seats 49 and 50 respectively separated by a part 51 of the bore 40 that is interconnected to the inlet 12 by a transverse opening 52 of the cage 38 that is disposed in aligned relation with the inlet 12 and which passes completely and transversely through the valve cage 38.

Similarly upper and lower transverse openings 53 and 54 pass transversely through the valve cage 38 respectively outboard of the valve seats 50 and 49 so as to respectively interconnect upper and lower portions 55 and 56 of the stepped bore 40 to the outlet 13, the portions 55 and 56 also forming integral upper and lower guides for the valve stem means 31 as will be apparent hereinafter.

A lower plug and stem assembly 32' of the valve stem means 31 is adapted to be inserted down through the stepped bore 40 of the valve cage 38 through the upper end 41 thereof, the assembly 32' carrying a pair of spaced valve members 57 and 58 which are adapted to respectively cooperate with the valve seats 50 and 49 to simultaneously open and close the same as illustrated in FIGS. 1 and 2 depending upon the up and down position of the valve stem means 31.

The lower part 32' of the valve stem means 31 also carries upper and lower spool portions 59 and 60 which respectively are disposed in the integral guide portions 55 and 56 of the stepped bore 40 so as to guide the up and down movement of the valve stem means 31 relative to the valve seat cage 38 during the movement of the valve members 57 and 58 relative to the valve seats 50 and 49, the spool portion 59 being formed as part of the valve member 57 if desired.

The spool part 59 of the valve member 57 can be detachably secured to the upper part 32 of the stem means 31 through a threaded connection thereof as illustrated in FIG. 2, rather than be integral therewith as desired, whereby the lower stem part 32' is detachably secured to the upper stem part 32.

Therefore, it can be seen that the valve seat cage 38 can be readily removable from the chamber 16 of the valve body 11 by opening the cover 35 and removing the valve cage 38 down out through the opening 33. Thus, a new valve cage 38 can be replaced therein in a simple manner. Likewise, the valve seats 59 and 58 of the valve stem means 31 can be easily removed through the opening 33 by unthreading the lower portion 32' of the valve stem 31 from the upper portion 32 thereof and removing the same out through the opening 33 after the valve cage 38 has been removed therefrom and a new lower stem portion 32' can be then detachably secured to the upper valve stem part 32 through the threaded connection. Thereafter, a new valve cage means 38 can be utilized therewith.

The operation of the valve construction 10 will now be described.

It can readily be seen that fluid can enter the inlet 12 of the valve body 10 and will enter through the transverse opening 52 to the part 51 of the stepped bore 40 of the valve seat cage 38, such fluid at the part 51 will be prevented from flowing through the valve seats 50 and 49 by the valve members 57 and 58 when the same are disposed against the valve seats 50 and 49 in the manner illustrated in FIG. 1. However, when the valve seat means 31 is moved upwardly from the position illustrated in FIG. 1 to the position illustrated in FIG. 2, it can be seen that the valve seat members 57 and 58 are respectively moved away from the valve seats 50 and 49 so that fluid from the inlet 12 can now be interconnected to the outlet 13 through the open valve seats 50 and 49 until such valve seats 50 and 49 are again closed by the valve members 57 and 58.

Should the valve construction 10 need to be serviced in the field, the valve construction 10 can remain in the pipeline utilizing the same and the actuator that controls the valve stem 31 could be pressurized to move the valve stem 31 downwardly after the cover member 35 has been removed to drive the valve seat cage 38 out through the opening 33 for servicing thereof. Thus, should a new valve cage 38 and lower stem portion 32' be required, the same can be replaced and then the valve stem means 31 can be driven upwardly and the cage 38 pushed inwardly so that when the cover member 35 is replaced, the cover member 35 will lock against the end 42 of the valve cage 38 to lock the valve cage 38 in place as illustrated whereby the cage 38 is again sealed to the openings 17 and 18 of the valve body 19.

Therefore, it can be seen that one advantage of having the valve seat cage 38 be provided with integral upper and lower guides 55 and 56 is that the cage 38 can be made from a precision casting which would be easily chucked and machined to the very exacting tolerances necessary to obtain good seat non-leakage characteristics in a relatively small part. In the conventional top and bottom ended valves, the inserts are roughed out and installed in the valve body and during assembly, in most cases, they are machined to fit a particular plug and stem assembly to achieve these good non-leak characteristics. However, in doing this, it is necessary for the complete body to be chucked out in a lathe and machined whereas with the structure of this invention, only the valve seat cage 38 need be chucked up and machined to fit a given plug and stem assembly arrangement 32'.

Another advantage of the structure of this invention is that the valve seat cage 38 is made with the opening 52 through which the fluid must flow before entering the valve seats 49 and 50 and therefore it is possible to characterize or form the opening 52 in the cage 38 in such a manner as to keep the valve noise to a minimum. Conversely, should the outlet 13 be utilized as an inlet and inlet 12 as an outlet, the transverse openings 53 and 54 also provide this noise control feature.

Thus, it can be seen that one of the features of this invention is the ease of machining the valve construction 10 and that the valve cage 38 can be relatively small and symmetrical in design that can be chucked in a precision lathe to accomplish the very close dimensions that are required as opposed to chucking a large valve body as in the past.

Further, the ease of servicing the valve construction 10 of this invention can readily be seen as the same eliminates the need for removal of the entire valve construction 10 from its installation during servicing of the valve seat portions thereof.

Accordingly, it can be seen that this invention not only provides an improved valve construction, but also this invention provides an improved method of making such a valve construction or the like.

While the form and method of this invention now preferred have been described and illustrated as required by the patent statutes, it is to be understood that other forms and methods can be utilized and still come within the scope of the appended claims.

What is claimed is:

1. A valve construction comprising a valve body having an inlet and an outlet interconnected together by a chamber of said valve body, a one-piece valve seat cage disposed in said chamber and having valve seat means disposed between said inlet and said outlet, said cage having integral guides disposed on opposite sides of said valve seat means, a valve stem means movably guided by said guides and having valve member means for cooperating with said valve seat means to open and close the same, said valve body having an opening therein leading to said chamber, said valve seat cage being insertable through said opening into said chamber and being removable from said chamber out through said opening, and a cover member detachably secured to said valve body to close said opening, said valve body being one-piece and having a bonnet formed integrally therewith in aligned relation to said opening and on the opposed side of said valve body from said opening.

2. A valve construction as set forth in claim 1 wherein said bonnet has an opening passing therethrough and receiving part of said valve stem means therethrough.

3. A valve construction as set forth in claim 2 wherein said bonnet has a packing cavity formed in said opening thereof, and packing means disposed in said cavity and surrounding said part of said valve stem means.

4. A valve construction as set forth in claim 1 wherein said valve body has shoulder means and said cage has shoulder means adjacent said valve seat means and cooperating with said shoulder means of said valve body to seal said cage in said chamber of said valve body.

5. A valve construction as set forth in claim 4 and including gasket means disposed between said shoulder means of said valve body and said shoulder means of said cage.

6. A valve construction comprising a valve body having an inlet and an outlet interconnected together by a chamber of said valve body, a one-piece valve seat cage disposed in said chamber and having valve seat means disposed between said inlet and said outlet, said cage having integral guides disposed on opposite sides of said valve seat means, and a valve stem means movably guided by said guides and having valve member means for cooperating with said valve seat means to open and close the same, said valve seat means comprising two spaced apart and aligned valve seats, said valve member means of said valve stem means comprising two spaced apart valve members on said valve stem means for respectively cooperating with said valve seats to substantially simultaneously open and close the same, said valve seats respectively having openings passing therethrough, said guides of said cage comprising a pair of openings passing through opposed ends of said cage and being disposed in alignment with openings of said valve seats, said cage having a pair of transverse openings formed therein respectively leading from one of said inlet and said outlet of said valve body to said guide openings thereof whereby said guide openings respectively interconnect said transverse openings to said valve seat openings.

7. A method of making a valve construction comprising the steps of forming a valve body with an inlet and an outlet interconnected together by a chamber of said valve body, forming a one-piece valve seat cage, disposing said cage in said chamber so that valve seat means of said cage is disposed between said inlet and said outlet, forming said cage with integral guides disposed on opposite sides of said valve seat means, forming a valve stem means, assemblying said valve stem means with said cage so that said valve stem means is movably guided by said guides and has valve member means thereof cooperating with said valve seat means to open and close the same, forming said valve body with an opening therein leading to said chamber, inserting said valve seat chage through said opening into said chamber and removing said cage from said chamber out through said opening, detachably securing a cover member to said valve body to close said opening, forming said valve body from a one-piece structure, and forming a bonnet integrally with said valve body in aligned relation to said opening and on the opposed side of said valve body from said opening.

8. A method as set forth in claim 7 and including the steps of forming said bonnet with an opening passing therethrough, and disposing part of said valve stem means through said opening.

9. A method as set forth in claim 8 and including the steps of forming part of said opening of said bonnet as a packing cavity, and disposing packing means in said cavity to surround said part of said valve stem means.

10. A method as set forth in claim 7 and including the steps of forming said valve body with shoulder means, and forming said cage with shoulder means adjacent said valve seat means to cooperate with said shoulder means of said valve body to seal said cage in said chamber of said valve body.

11. A method as set forth in claim 10 and including the step of disposing gasket means between said shoulder means of said valve body and said shoulder means of said cage.

12. A method of making a valve construction comprising the steps of forming a valve body with an inlet and outlet interconnected together by a chamber of said valve body, forming a one-piece valve seat cage, disposing said cage in said chamber so that valve seat means of said cage is disposed between said inlet and said outlet, forming said cage with integral guides disposed on opposite sides of said valve seat means, forming a valve stem means, assembling said valve stem means with said cage so that said valve stem means is movably guided by said guides and has valve member means thereof cooperating with said valve seat means to open and close the same, said valve seat means comprising two spaced apart and aligned valve seats, said valve member means of said valve stem means comprising two spaced apart valve members on said valve stem means for respectively cooperating with said valve seats to substantially simultaneously open and close the same, forming said valve seats respectively with openings passing therethrough, said guides of said cage comprising a pair of openings passing through opposed ends of said cage and being disposed in alignment with openings of said valve seats, and forming said cage with a pair of transverse openings respectively leading from one of said inlet and said outlet of said valve body to said guide openings thereof whereby said guide openings respectively interconnect said transverse openings to said valve seat openings.

* * * * *